3,366,618
PROCESS OF PREPARING PURIFIED LAC
Marvin Weiss, New Providence, Sidney Beinfest, Berkeley Heights, Peter J. Gregory, Jersey City, and Phillip Adams, Murray Hill, N.J., assignors, by mesne assignments, to Millmaster Onyx Corporation, a corporation of New York
Filed June 26, 1962, Ser. No. 205,344
3 Claims. (Cl. 260—107)

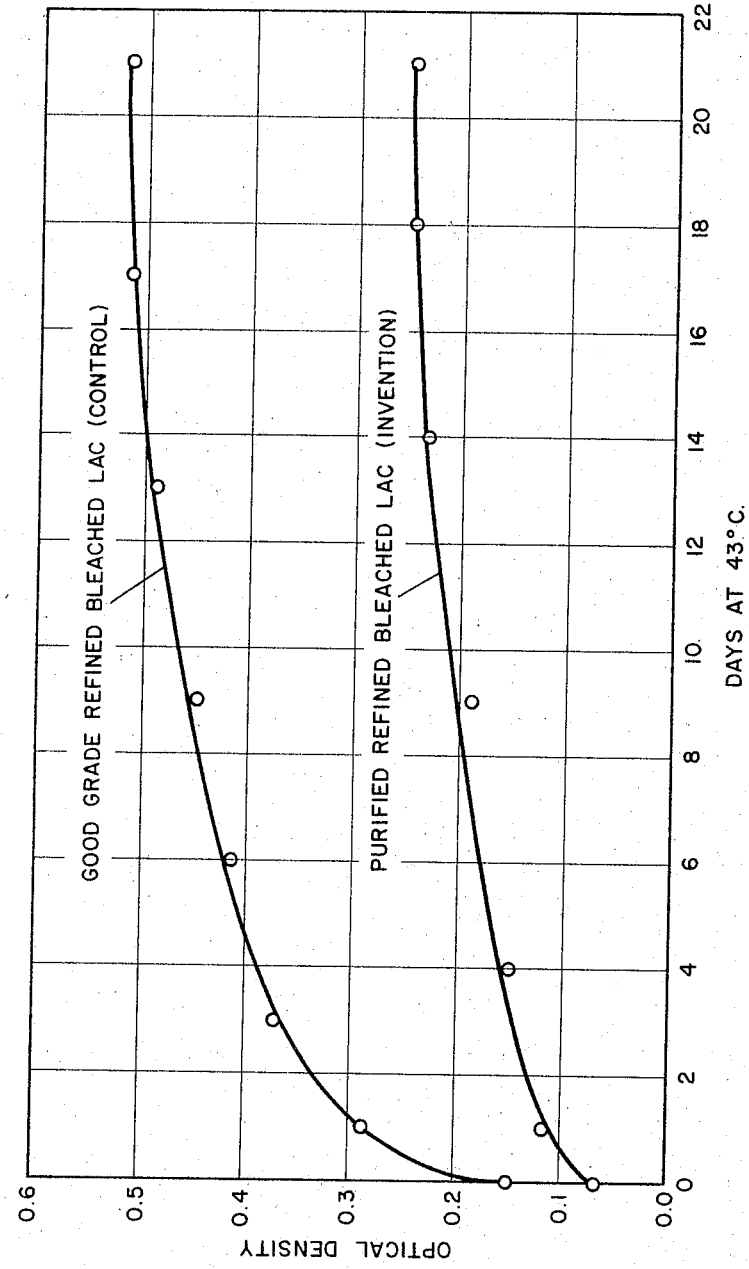

This invention relates to a novel process for the manufacture of a purified lac and a purified bleached lac of improved color characteristics.

Lac is obtained from a protective resinous incrustation secreted by the insect "Laccifer lacca" which is indigenous to southeast Asia and adjoining islands. This incrustation is known as "sticklac." When sticklac has been ground, sieved and washed with water or dilute soda ash solution and dried, the product so obtained is known as "seed lac." Shellac is the product obtained by refining seedlac by heat process or solvent process, or by both heat and solvent process.

For the purpose of this invention, lac is defined to mean sticklac, seedlac, shellac or other forms of commercial unbleached lac. These are all articles of commerce which have not been bleached.

Regular bleached lac, also known as regular bleached shellac, contains the normal amount of wax found in lac. It is produced by dissolving seedlac or shellac in soda ash solution at an elevated temperature and bleaching in solution with chlorine usually in the form of sodium hypochlorite solution. The bleached lac is recovered by precipitation with dilute acid, e.g., sulfuric acid, and the precipitate agglomerated by heating. The floating lac is removed, drained, ground and dried.

Refined bleached lac, also known as refined bleached shellac, is similar to regular bleached lac from which the wax has been removed, e.g., by filtration, either prior to or after bleaching.

Bleached lac has been in use for many years as a coating material in the form of alcohol solutions and varnishes. Since 1945, bleached lac has been found increasingly larger use as an important ingredient in self-polishing waxes. It has admirable properties for this purpose, but the main disadvantage is its initial excessive color which darkens fairly rapidly upon aging. This darker color has resulted in a diminishing market in no-rub floor wax and other polish fields to competitive polymeric materials. It is therefore desirable to be able to obtain a bleached lac of initial light color and improved color stability.

This invention provides a successful method of accomplishing that purpose. A procedure for purifying lac has been discovered. This purification removes a significant part of the original color bodies plus other impurities responsible for the color instability. When this purified lac is subsequently bleached by the more or less conventional process known to the art, a purified bleached lac is obtained which has far better color characteristics than has ever been known for bleached lac, and approaches that of light synthetic polymers.

The method of purification comprises suspending ground lac in an aqueous alkaline solution which has a common cation concentration such that the resulting lac salt of the alkali cation is substantially insoluble in that solution, while the dyes and other impurities are soluble in the alkaline solution. The mixture results in a suspension in which the salt of the lac resin is the insoluble phase and the significant part of the impurities are in solution. The insoluble resin salt is separated from the solution, e.g., by filtration and may be washed if desired with fresh aqueous solution with a common cation concentration about the same as the original solution, although the anion may be different. This purified lac salt is then dissolved in warm water and bleached in the conventional manner, e.g. with sodium hypochlorite solution. The purified bleached lac is recovered in the conventional manner.

The alkali can be any Group Ia alkali metal, e.g., Li, K, Na, etc. including $NH_3$, hydroxide, carbonate, or bicarbonate. The common alkali metal cation may be supplied by the carbonate or any soluble neutral or alkaline salt whose aqueous pH is below 11. The minimum quantity of alkali needed for lac salt formation is one equivalent for approximately 700 g. of lac, depending on its acid number. While any alkali metal cation system may be used, the most economical one is the sodium cation system. It is to be understood that the common cation can be any Group Ia alkali metal cation and thus different cations can be employed to achieve the desired effect. Thus the ground lac can be suspended in a solution of mixed cations, e.g., Na and K or a solution of, e.g., the Na lac salt can be precipitated by adding, e.g., K or Li cation.

The following description and examples are given for the sodium system, and it is understood that other alkali metal systems may be used, due consideration being given to differences in atomic weights and solubilities.

As previously stated, for approximately 700 g. of lac, the minimum alkali required is one gram equivalent, i.e., 40 g. of sodium hydroxide or 53 g. of sodium carbonate. Sodium carbonate is preferred. Exclusive of the minimum alkali requirement, the minimum cation concentration in the solution phase should be approximately 1 N (normal) with respect to sodium to avoid too great a loss of lac. A concentration of sodium ion greater than 2 N does not serve any useful purpose. The preferred range is from 1.1 to 1.7 N with respect to sodium ion. Any soluble sodium salt as defined may be used to supply the sodium ion, but for economic reasons sodium chloride, sodium carbonate or sodium sulfate are preferred.

The concentration of lac in the slurry can conveniently be from 1 to 50% by weight. The preferred concentration is from 10–30%. The temperature range for the formation of lac resin sodium salt is from about 0°–60° C., with a preferred range of 30°–35° C. The time required will depend on the temperature and the particle size of the ground lac. Thus, at 33° C. with 40-mesh lac, approximately 30 minutes will be required to complete the formation of the resin salt and extraction of the color and impurities into the solution. Reasonably longer periods are not detrimental.

It is also possible to employ a variation of this invention by starting with a solution of lac in alkali at the same ratio as previously mentioned, approximately 700 g. of lac for one g. equivalent of alkali. Concentration of lac may be in the range of approximately 10–30% by weight. The lac resin salt is precipitated by adding sufficient common cation to bring its concentration into the range previously stated, i.e., 1–2 N, followed by treatment as indicated. It is to be understood that this invention contemplates both methods of operation.

An alternate to the filtration of the lac resin salt is to heat the slurry to approximately 50° C. at which point the resin salt will coalesce. It can be physically removed and allowed to drain or washed with fresh salt solution of the same concentration as the mother liquor, followed by treatment as indicated.

This invention and its advantages will be better understood by reference to the following examples.

*Example 1*

To 150 lbs. 1.5 N sodium carbonate solution was added 15 lbs. of finely ground Kusmi seedlac. The slurry was agitated at 30° C. for 30 minutes and filtered. The filter cake was washed with 1.5 N sodium carbonate solution until the wash liquor was almost colorless. The filter cake was then dissolved in 150 lbs. of water at 45° C., filtered to remove the natural wax and dirt, and bleached with sodium hypochlorite solution. The bleached liquor was acidified with dilute sulfuric acid to a pH of 4 and heated to approximately 50° C. to coalesce the precipitated product. The floating mass was collected, washed in cold water, ground and dried. 12 lbs. of purified refined bleached lac was obtained. A 15% solution of this product in aqueous ammonia had a Gardner color of 2, far superior to conventional products.

*Example 2*

50 g. of ground Kusmi seedlac was dissolved in 500 ml. of 0.15 N sodium carbonate at 45° C. The dark red solution was filtered and then enough 30% sodium chloride added to bring the concentration of the lac solution to 1.2 N sodium chloride. The lac resin sodium salt precipitated. The suspension was heated to approximately 50° C. to coagulate the resin sodium salt into one mass. The mass was removed, rinsed with 1.2 N sodium chloride solution, and redissolved in 500 ml. of water at 45° C. this solution was bleached and the purified bleached lac was recovered as in Example 1.

*Example 3*

25 g. of ground Kusmi seedlac was suspended in 250 ml. of 1.13 N sodium carbonate and agitated at 30° C. for 30 minutes. The lac resin salt was filtered and washed with 1.13 N sodium carbonate solution. This purified lac resin sodium salt was dissolved in water at 45° C. and compared to a solution of the original lac dissolved in an equivalent of sodium carbonate at 45° C. The color of these two solutions were measured at identical concentrations of lac with a Beckman DU spectrophotometer at the wavelengths of 425 m$\mu$ and 505 m$\mu$. The purified lac resin solution showed only 43% of the color present in the original lac.

*Example 4*

25 g. of ground Kusmi seedlac was suspended in 250 ml. of 1.7 N potassium carbonate solution and agitated at 30° C for 30 minutes. When treated as in Example 3, the purified lac resin solution showed only 52% of the color present in the original lac. When bleached as in Example 1, the product in ammonia solution had a similar Gardner color.

*Example 5*

To 800 ml. of a solution of 0.38 N sodium carbonate and 1.7 N sodium chloride was added 100 g. of ground Kusmi seedlac and slurried for 1 hour at 25° C. The purified lac resin salt was filtered and washed with 1.7 N sodium chloride solution. This was treated as in Example 1 to obtain a purified refined bleached lac. A 15% solution in aqueous ammonia had a Gardner color of 2.

*Example 6*

10 g. of ground Kusmi seedlac was suspended in 100 ml. of 1.8 N ammonium chloride containing 1.17 g. of 28% ammonium hydroxide and agitated at 30° C. for 30 minutes. The suspended lac resin ammonium salt was filtered, and washed with 1.8 N ammonium chloride. The purified lac resin salt was recovered in good yield.

*Example 7*

25 grams of ground Siam B seedlac, a lac of high bleach index, was slurried in 1.66 N sodium carbonate solution for 30 minutes at 30° C. The lac resin salt was filtered and washed with 1.5 N sodium carbonate solution until the wash was almost colorless. The purified lac resin salt was treated as in Example 1 to obtain a purified refined bleached lac. A 15% solution in aqueous ammonia had a Gardner color of 3+. A sample of Siam B refined bleached lac prepared in the conventional manner known to the art had a Gardner color in 15% solution in ammonia of 10.

*Example 8*

To 250 cc. of a solution of 1.7 N sodium sulfate was added 3 g. of potassium carbonate and 25 g. of Kusmi seedlac and slurried in water as in Example 5. A 15% solution of the purified refined bleached lac had a Gardner color of 2+. This example demonstrates the effectiveness of mixed different cations.

*Example 9*

An experiment similar to that of Example 8 was carried out with 25 g. Kusmi seedlac employing 2.5 g. of sodium carbonate and 250 cc. of 1.7 N potassium sulfate. The purified refined bleached lac in aqueous ammonia had a Gardner color of 2, also demonstrating the efficacy of mixed cations.

*Example 10*

The Gardner colors cited in the previous examples are on freshly prepared solutions. Purified refined bleached lac was used in the examples, since it is not possible to read color accurately on purified bleached lac which still contains the wax. The products containing the wax are similarly light in color.

To show the beneficial effect on aging, purified refined bleached lac of this invention was compared to a good grade of commercial refined bleached lac made from Kusmi seedlac. The following table shows the Gardner colors at room temperature (25° C.) and accelerated aging at 43° C.

| Aging (days) | Purified Refined Bleached Lac of This Invention | | Refined Bleached Lac. (Control) | |
| --- | --- | --- | --- | --- |
| | 25° C. | 43° C. | 25° C. | 43° C. |
| 0 | 2 | 2 | 7+ | 7 |
| 3 | 3+ | 6+ | 8+ | 10+ |
| 6 | 3+ | 7+ | 9− | 11+ |
| 10 | 4 | 9− | 9− | 12− |
| 20 | 4+ | 9++ | 9+ | 13 |

These figures show the superior color characteristics of the products of this invention as regards both initial color and color stability.

The optical density (equal to $$\log\left(\frac{1}{T}\right)$$

where T is light transmission) was determined over a 20 day period at 43° C. for the purified refined bleached lac of this invention and a control, a good grade refined bleached lac. The results are shown in the graph in the drawing. These results demonstrate the better initial color of the material of this invention, its better color after aging, and particularly the smaller slope in its optical density curve. These figures are significant in view of the greater reliability and scientific nature of these precise measurements as compared to the Gardner readings.

The advantages of this invention will be apparent to those skilled in the art. Refined shellac products of greatly improved initial and aged color characteristics are provided.

It is to be understood that this invention is not limited to the specific examples which have been offered merely as illustrations and the modifications may be made without departing from the spirit of the invention.

What is claimed is:

1. A process for purifying lac which comprises suspending the lac in an aqueous alkaline solution at a temperature in the range of about 0–60° C., the alkali content of the solution being at least one gram equivalent of alkali for approximately 700 grams of lac, to form the lac salt, and the solution in addition containing an alkali metal cation concentration of at least 1 Normal such that the resulting lac salt is maintained as a solid phase, and then separating the purified lac salt from the residual liquid phase containing impurities.

2. The process of claim 1 in which the alkali is sodium carbonate.

3. A process for purifying lac which comprises dissolving the lac resin in an aqueous alkaline solution which contains at least one gram equivalent of alkali for approximately 700 grams of lac, to form and dissolve the lac salt and then adding to the solution an amount of alkali metal cation such that the added cation is at least 1 Normal, to precipitate the lac resin salt as a solid phase from the solution and separating the purified lac salt from the residual liquid phase containing impurities.

References Cited

UNITED STATES PATENTS 2,397,389  3/1946  Vincent _____ 260—107

FOREIGN PATENTS 496,124  11/1938  Great Britain.
419,667  11/1934  Great Britain.

DONALD E. CZAJA, *Primary Examiner.*

LEON J. BERCOVITZ, *Examiner.*

F. McKELVEY, J. ZIEGLER, *Assistant Examiners.*